United States Patent [19]
Jenkins

[11] Patent Number: 6,019,014
[45] Date of Patent: Feb. 1, 2000

[54] MEANS FOR ANCHORING AN ELONGATE MEMBER

[75] Inventor: Adrian Charles Morgan Jenkins, Swansea, United Kingdom

[73] Assignee: Adwest Bowden TSK Limited, Wales, United Kingdom

[21] Appl. No.: 09/109,544

[22] Filed: Jul. 2, 1998

[30] Foreign Application Priority Data

Jul. 3, 1997 [GB] United Kingdom ................... 9714060

[51] Int. Cl.⁷ ..................................................... F16C 1/26
[52] U.S. Cl. ......................................... 74/502.4; 403/325
[58] Field of Search ............................ 74/501.5 R, 502.4, 74/502.6, 500.5; 403/325, 324, 321

[56] References Cited

U.S. PATENT DOCUMENTS

| | | | |
|---|---|---|---|
| 3,631,738 | 1/1972 | Harper | 74/502.4 |
| 4,074,945 | 2/1978 | Kraus et al. | 74/502.4 X |
| 4,262,409 | 4/1981 | Madej | 74/502.4 X |
| 4,304,148 | 12/1981 | Hamman | 74/502.4 |

FOREIGN PATENT DOCUMENTS

| | | | |
|---|---|---|---|
| 0703395 | 3/1996 | European Pat. Off. | |
| 2532381 | 3/1984 | France | 74/502.4 |
| 2842960 | 6/1979 | Germany | 74/502.4 |

*Primary Examiner*—Mary Ann Battista
*Attorney, Agent, or Firm*—Dennison, Meserole, Scheiner & Schultz

[57] ABSTRACT

An anchorage is provided for anchoring an elongate member (2) such as a Bowden-type control cable to a flat member (7) such as a vehicle bulkhead having an undercut slot (5) in an edge (6) thereof. The anchorage comprises a sleeve (1) which is fixable coaxially around the elongate member (2) and which is formed with a peripheral groove (4) whose axial length is sufficient to accommodate the thickness of the flat member (7) at its slot (5). The groove (4) defines a neck (8) which is a close fit into the slot (5), and at least one plunger member (9) carried by the sleeve (1) is axially movable relative to that sleeve (1) from a position in which it is clear of the groove (4) into a position in which it projects across the groove and enlarges the size of the neck (8) to a dimension such as to form an interlock with the undercut (11) of the slot (5), to resist withdrawal of the anchoring sleeve (1) therefrom.

10 Claims, 2 Drawing Sheets

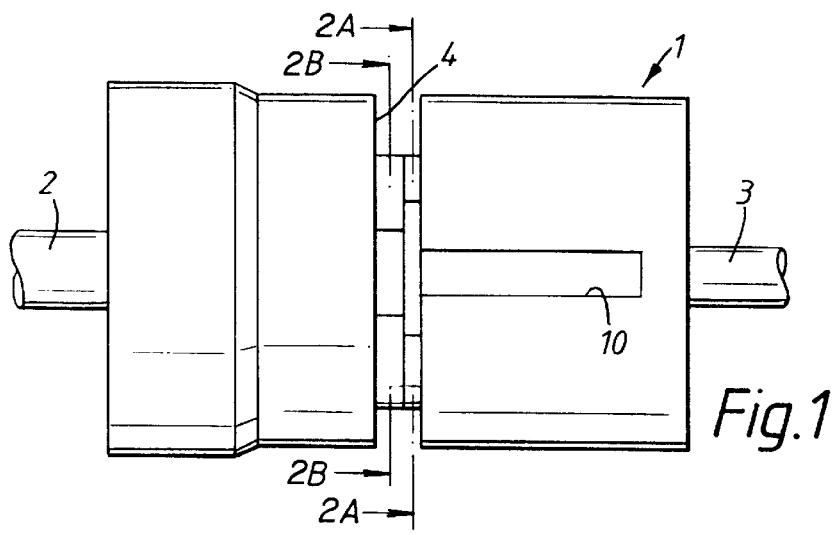
Fig.1
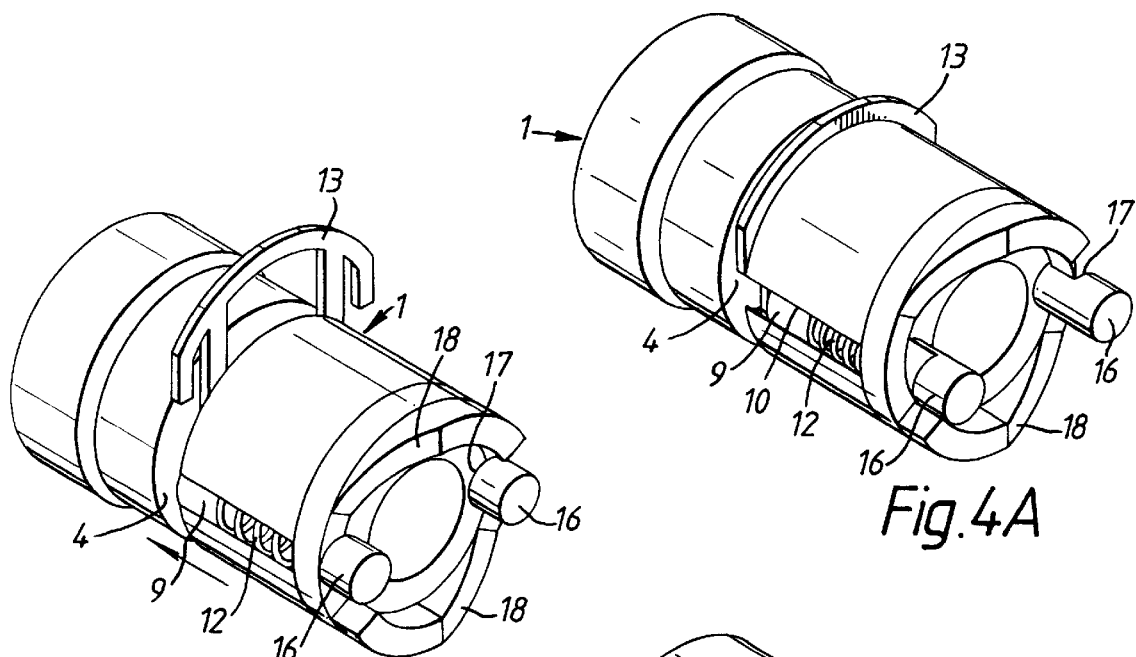
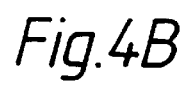
Fig.4B
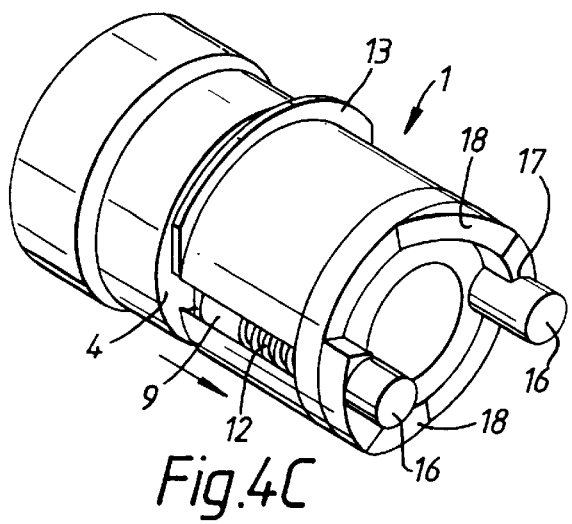
Fig.4A
Fig.4C

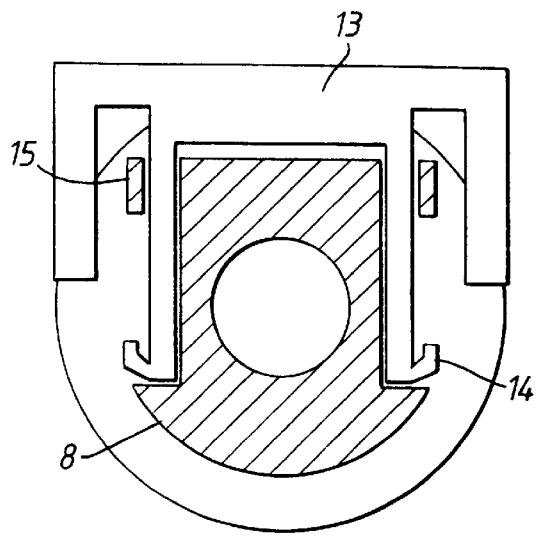
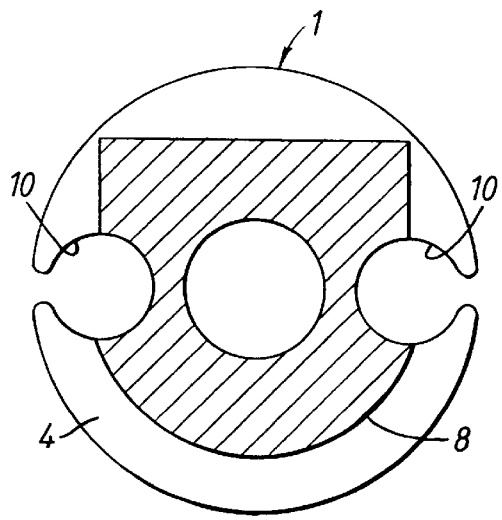
*Fig.2A*  *Fig.2B*
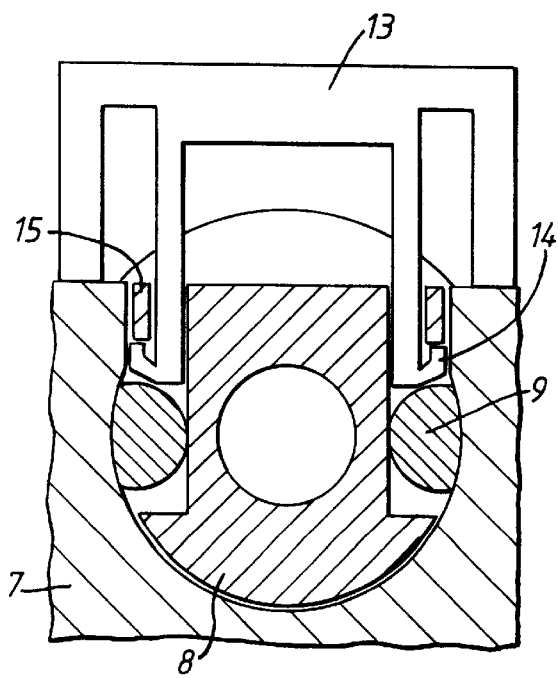
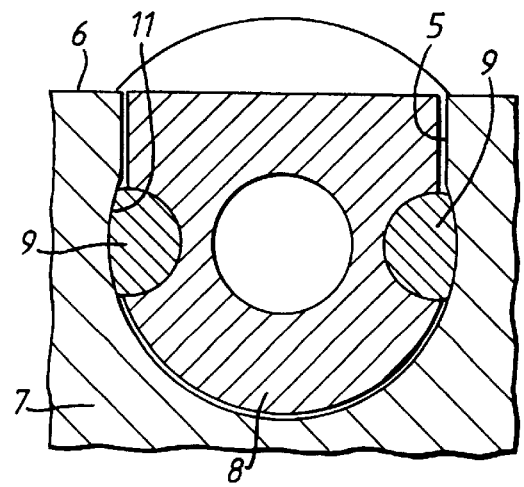
*Fig.3A*  *Fig.3B*

MEANS FOR ANCHORING AN ELONGATE MEMBER

BACKGROUND OF THE INVENTION

1. Field of the Invention

This invention relates to means for anchoring an elongate member to another member. The invention was made with particular reference to the anchoring of Bowden-type cables to fixed parts of the chassis or bodywork of an automobile, and the invention will be described in that context in this specification. It will, however, be appreciated that such an anchoring member can be used for anchoring many other elongate members, and in many other circumstances.

2. Description of Related Art

As is well known, a Bowden-type cable is a device for translating a push/pull movement at one location to a push/pull movement (in the same or any different direction) at a different location, often for control purposes, and such a cable comprises a flexible conduit in which a control wire is slidable to perform the desired function. In order for the relative movement of the control wire and the conduit to take place in a controlled manner for the reliable operation of, for example, a clutch or gearbox mechanism or throttle of a motor vehicle, it is necessary that each end of the conduit should be anchored, for example to the body of the vehicle. In particular, the practice has developed of anchoring an end of the conduit to an opening in a bracket or bulkhead across which the control cable passes.

In a particular arrangement which is known for this purpose, the bracket or bulkhead is provided with a generally circular hole near one edge, the hole being connected to that edge by a slot whose width is less than the diameter of the circular hole. That edge of such a bulkhead may be a peripheral edge, or it may be an edge of another, larger hole formed within the bulkhead. The effect is thus to provide a slot having undercut walls in an edge of the bulkhead, and in fact the profile of the slot may take the general form of the Greek capital letter Ω (omega), though the neck need only be about 5% narrower that the diameter of the circular undercut for effective anchoring. An anchoring sleeve or end fitting for the Bowden-type cable may comprise a neck of a diameter which will pass into and along the slot, in a direction which is parallel to a plane of the bracket or bulkhead and perpendicular to the axis of the cable. Such sleeve or end fitting can therefore be located in the undercut portion of the slot. The anchoring device may include a collar which may be slid or screwed axially of the anchor fitting to cause filling of the circular undercut of the slot and thus resist withdrawal of the anchorage from the slot in a direction radial of the cable axis, and also resist axial movement of the anchorage relative to that slot.

In industry in general, and in particular in the automotive industry, there is a never ending search for the simplification or speeding up of the assembly process, and as one step in this search, there has arisen the proposal as set forth in EP-A-0 703 395 (ACCO LA TELEDYNAMIQUE SA) to provide a helically tensioned spring for the automatic screwing of such a collar. Such construction is, however, somewhat complicated, and it requires accurate centering within the slot before reliable anchoring can take place.

SUMMARY OF THE INVENTION

It is an object of this invention to provide an anchoring device in which a proper and reliable anchoring can be achieved easily and quickly.

According to the present invention, there is provided means which is suitable for anchoring an elongate member to a flat member having an undercut slot in an edge thereof, which anchoring means comprises a sleeve which is fixable coaxially around said elongate member and which is formed with a peripheral groove whose axial length is sufficient to accommodate the thickness of such flat member at said slot, such groove defining a neck which is a close fit into said slot, and at least one plunger member carried by the sleeve which is axially movable relative to said sleeve from a position in which it is clear of said groove into a position in which it projects across said groove and enlarges the size of said neck to a dimension such as to form an interlock with the undercut of said slot, to resist withdrawal of the anchoring sleeve therefrom.

Such an anchoring sleeve can be secured to a said flat member constituted by a portion of a bracket or bulkhead extremely easily and quickly to form a reliable anchorage for an elongate member surrounded by the sleeve.

Such anchoring means preferably has one or more of the following optional features:

there are two plunger members located symmetrically of the neck of the sleeve;

the or each plunger member is spring-loaded to the position in which it projects across said groove;

the or each plunger member is tapered to enter said groove and engage in a said undercut with a wedge action;

a clip is provided for holding the or each plunger member against such spring-loading;

such clip is slidable along said groove by the edges of a said slot as the neck is inserted into that slot whereby the plungers are automatically released for entry into a said undercut;

such clip is held captive to said anchoring sleeve;

means is provided for withdrawing the or each plunger for release of said anchoring sleeve from said slot;

such withdrawal means comprises a rotatable wedge arranged to co-operate with a shoulder provided on the or each plunger member.

BRIEF DESCRIPTION OF THE DRAWINGS

A preferred embodiment of the invention will now be described by way of example only, with reference to the accompanying diagrammatic drawings in which:

FIG. 1 is a side elevation of an anchoring sleeve positioned on an elongate body which is to be anchored;

FIGS. 2A and 2B are respectively cross sections through the anchoring sleeve of FIG. 1 along the lines 2A—2A and 2B—2B of FIG. 1, prior to anchoring, with the addition of a clip;

FIGS. 3A and 3B are respectively cross sections through the anchoring sleeve of FIG. 1 along the lines 2A—2A and 2B—2B of FIG. 1, after anchoring to a bracket, with the addition of a clip;

FIGS. 4A, 4B and 4C are perspective views of an anchoring device in three different states.

DESCRIPTION OF THE PREFERRED EMBODIMENTS

In FIG. 1 of the drawings, an anchoring sleeve generally indicated at 1 is slid over the end of a conduit 2 of a Bowden-type cable, and a guide tube 3 is provided for the control wire (or an end rod provided on the control wire)

which is not shown. The anchoring sleeve 1 is provided with a groove 4 by which the sleeve may be fitted to an appropriately shaped undercut slot 5 (FIG. 3) in an edge 6 of a bracket or vehicle bulkhead 7. The length of the peripheral groove 4 in the axial direction is sufficient to accommodate the thickness of such bracket or bulkhead around the slot 5, and it surrounds a neck 8 of the sleeve 1 which is a close fit into the slot 5.

In order to secure the neck 8 of the anchoring sleeve 1 within the slot 5, two plungers 9 are provided which are axially slidable in channels 10 within the body of the anchoring sleeve 1. These plunger members 9 are movable relative to said sleeve from a position in which they are clear of the groove 4 defining the neck 8 into a position in which they project across the groove and enlarge the size of the neck 8 to a dimension such as to form an interlock with the undercut 11 of the slot 5, to resist withdrawal of the anchoring sleeve therefrom.

The plunger members 9 are loaded by springs 12 to the position in which they project across the groove to effect such an interlock, and they are tapered to enter said groove and engage in the undercuts 11 with a wedge action.

A clip 13 is provided for holding the plunger members 9 against such spring-loading prior to inserting the anchoring sleeve into the slot 5 of the bracket or bulkhead 7.

In the arrangement illustrated, as the neck 8 of the anchoring sleeve 1 is slid into the slot 5 of the bracket or bulkhead 7, the clip 13 is displaced from the groove 4 by the edges 6 of the slotted (5) member 7, and the plungers are automatically released for entry into the undercut. Such an anchoring device can be fitted extremely quickly and it is thereby automatically and reliably secured to the bracket or bulkhead.

Proper orientation of the anchoring device into the slot for its securing by the wedge-shaped plungers is ensure by the D- or U-shaped profile of the neck 8 of the anchoring sleeve 1 which is best seen from FIGS. 2 and 3. The opposed flat face portions of the D- or U-section co-operate with the narrowed neck of the undercut 5 so that entry of the plungers 9 into the undercut portion of the slot 5 is ensured.

The clip 13 is held captive to the anchoring sleeve 1 not only so that it does no shake free and get lost prior to fitting of the anchor, but also so that it remains in case it should be desired subsequently to remove the anchoring device. This is effected by co-operation between a barbed end 14 of the clip 13, and a shoulder 15 provided in the body of the anchoring sleeve 1.

In FIG. 4, the plungers 9 have undercut heads 16 which are arranged to ride on rotatable wedges 17 provided at one end of the anchoring device 1 for withdrawal of the plungers 9 against the action of the springs 12.

Thus, in FIG. 4A, the clip 13 is within the groove 4 holding the plungers back and resisting the forces exerted by the springs 12 tending to thrust the plungers across the groove 4, but the rotatable wedges 17 are in a position to allow such movement of the plungers. The device is thus in condition ready for use for attachment to a bracket or bulkhead in order to anchor an elongate member such as a Bowden-type cable.

In FIG. 4B, the clip 13 is partly withdrawn from the groove 4 as though the anchoring device were inserted by it neck 8 into a slot such as 5 (FIGS. 3) to allow the plungers to advance across the groove 4 under the forces exerted by the springs 12 tending to thrust the plungers, but the rotatable wedges 17 are in a position to allow such movement of the plungers. The device is thus in the condition in which it would be in use for anchoring an elongate member such as an end of a Bowden-type cable.

In FIG. 4C, the rotatable wedges 17 have been rotated so that the undercut heads 16 of the plungers have ridden up the wedges thus withdrawing the plungers from their projection across the groove 4, and allowing withdrawal of the anchoring device from a bracket to which it was previously attached, and the clip 13 has been re-inserted into the groove 4 thus retaining the plungers in that position.

The device is extremely simple and quick to attach and provides a secure anchorage which may be easily removed if desired.

What is claimed is:

1. An elongate cylindrical sleeve assembly removably engagable with a plate via a hole in the plate of known dimensions, the hole being connected to an edge of the plate by a slot having a width which is less than the largest of the dimensions of the hole, the sleeve assembly comprising:

a sleeve having a generally centrally disposed peripheral circumferential groove constituting a neck region which is slidable along the slot from the edge of the plate to the hole;

regions on both sides of the neck region having dimensions exceeding the largest of the dimensions of the hole, such that the sleeve can be disengaged from the hole only by sliding the neck region along the slot, with the sleeve moving laterally in the plane of the plate;

at least one peripheral longitudinal channel extending from the neck region to one end of the sleeve and a plunger disposed in the at least one longitudinal channel which is movable axially of the sleeve, and occupies a space in the neck region between the sleeve and the hole when the sleeve is engaged with the plate, the sleeve being fixed in and prevented from sliding along the slot in the plate when the plunger occupies said space;

the sleeve being removable from engagement with the plate by axially withdrawing the plunger from said space and sliding the neck region in the slot of the plate.

2. The sleeve assembly according to claim 1, wherein two said longitudinal channels are disposed symmetrically around the sleeve, with one said plunger disposed in each said longitudinal channel.

3. The sleeve assembly according to claim 1, wherein said plunger is tapered to enter said space and engage boundary regions of the space with a wedge action.

4. The sleeve assembly according to claim 1, additionally comprising a cable control passing axially through the sleeve, the sleeve serving to removably anchor the cable control through the hole in the plate.

5. The sleeve assembly according to claim 1, additionally comprising means for withdrawing said plunger to disengage the sleeve from the hole.

6. The sleeve assembly according to claim 5, wherein the means for withdrawing comprises a rotatable wedge constructed and arranged to cooperate with a shoulder provided on said plunger.

7. The sleeve assembly according to claim 1, wherein said plunger is axially spring loaded to be urged resiliently towards a position in which said plunger occupies the space in the neck region.

8. The sleeve assembly according to claim 7, additionally comprising a clip for retaining said plunger against the spring loading, and out of engagement with the space in the neck region.

9. The sleeve assembly according to claim 8, wherein the clip is slidable along the groove forming said neck region as the neck region is moved along the slot in the plate, with sliding movement of the clip in one direction along the groove releasing the plunger for entry into the space.

10. The sleeve assembly according to claim 8, wherein the clip is held captive to said sleeve.

* * * * *